April 21, 1936.  DE WITT WARNER  2,038,459
MIRROR
Original Filed March 26, 1934   2 Sheets—Sheet 1
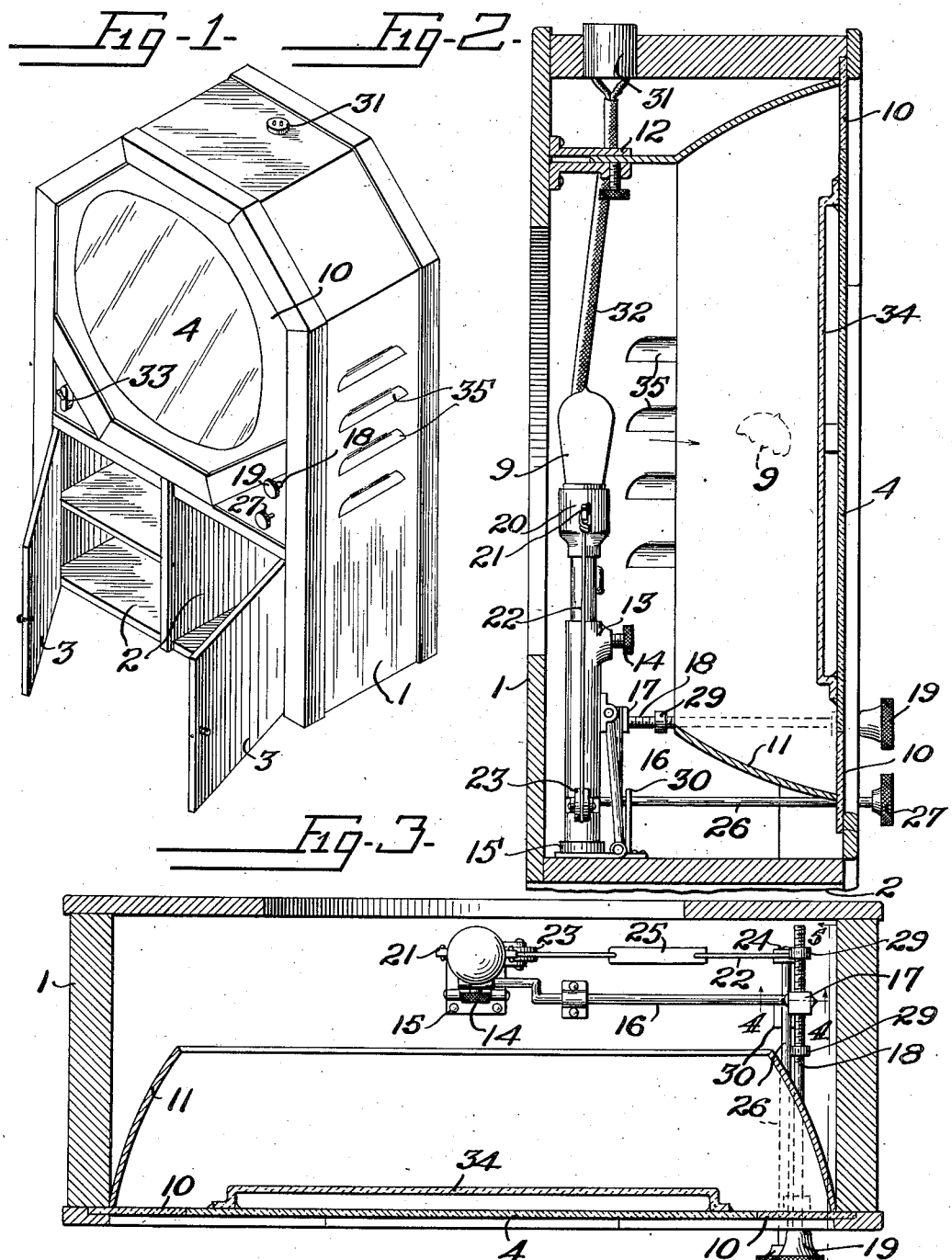
De Witt Warner, INVENTOR
BY Victor J. Evans & Co.
ATTORNEY April 21, 1936.  DE WITT WARNER  2,038,459
MIRROR
Original Filed March 26, 1934   2 Sheets-Sheet 2
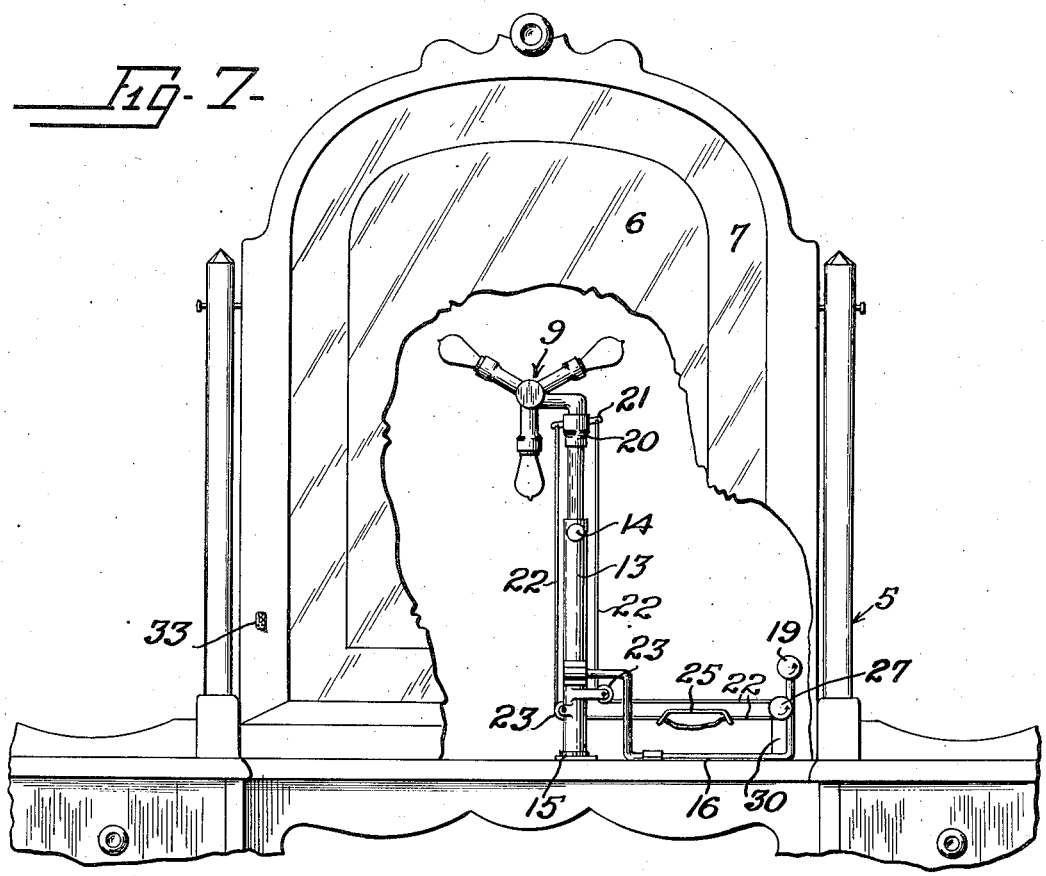
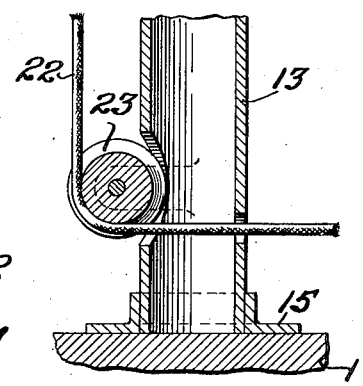
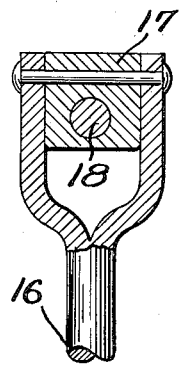
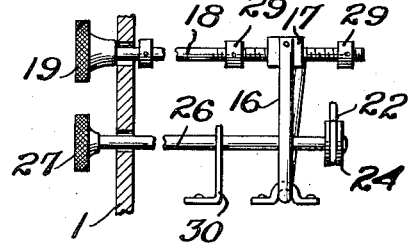
De Witt Warner,
INVENTOR
BY Victor J. Evans & Co.
ATTORNEY Patented Apr. 21, 1936

2,038,459

UNITED STATES PATENT OFFICE 2,038,459

MIRROR

De Witt Warner, Crane, Tex.

Application March 26, 1934, Serial No. 717,488
Renewed September 23, 1935

7 Claims. (Cl. 240—4.1)

This invention relates to mirrors and illuminating means therefor and has for the primary object the provision of a device of the above stated character which is especially adaptable for furniture, cabinets and like devices, so that a person standing in front of a mirror will be efficiently illuminated without glare or bright rays of light so that the reflection of the person in the mirror will be free of shadows and other effects having a tendency to render the reflection of the person in the mirror irregular or obscure.

Another object of this invention is the provision of adjustable indirect illuminating means for the mirror and which may be easily and quickly adjusted to suit the vision of the person using the mirror or to properly illuminate different persons that may stand or position themselves at varying distances from the mirror.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a perspective view illustrating the cabinet with the invention applied thereto.

Figure 2 is a vertical transverse sectional view through the cabinet.

Figure 3 is a horizontal sectional view.

Figure 4 is a detail sectional view taken on the line 4—4 of Figure 3.

Figure 5 is a detail view illustrating control elements for adjusting the position of the illuminating means and for controlling the brilliancy of said illuminating means.

Figure 6 is a detail sectional view showing the mounting of a control cable to the supporting post of the illuminating means.

Figure 7 is a fragmentary front elevation illustrating a dressing table or like piece of furniture, showing a slight modification of the invention.

Similar reference characters indicate corresponding parts throughout the several views in the drawings.

Referring to the drawings in detail, particularly Figures 1 to 6 inclusive, I designates a cabinet, the lower portion of which is equipped with compartments 2 normally closed by hinged doors 3. The compartments may be employed to receive various articles, as for example, toilet articles, or for storing articles therein. The cabinet I may be of any design suitable for the purpose and the upper portion of this cabinet carries a mirror and an indirect illuminating means therefor.

The mirror 4 as fitted in the cabinet I has surrounding it an area 10 capable of permitting light rays to pass therethrough and may be suitably treated or frosted to diffuse bright light rays or may be of convex construction. This area 10 provides a lens about the mirror 4 and may serve as the main supporting medium for such mirror. The area 10 is suitably mounted in the cabinet.

A reflector 11 is arranged in rear of the mirror and the area 10 and is adjustably connected in any suitable manner, as for example, at 12. The reflector 11 is capable of adjustment toward and from the area 10 and the mirror and is of substantially parabolical shape for the purpose of reflecting rays of light from the illuminating means hereinafter described.

The illuminating means 9 is arranged rearwardly of the reflector and also the mirror 4 and the area 10. The support and control for the illuminating means 9 consists of a telescopic post 13, its sections being adjustable for elevating and lowering the illuminating means. The sections of the post may be held in adjusted position by a set screw 14. One section of the post carries illuminating means, while the other section is mounted in a base 15. This base is of a construction that will permit the vertical swinging of the post to bring the illuminating means toward or away from the mirror and the area 10. The tilting of the post is accomplished through an operating mechanism which consists of a crank shaft 16 suitably journaled with one end journaled to the post 13 and the other end carrying or having pivoted thereto a feed nut 17. An operating shaft 18 is journaled in the cabinet and is threaded to receive the feed nut 17 and provided at its outer end with a finger piece 19, whereby the rotation of the latter may position the post at various inclinations or in an upright position, as is clearly shown in Figures 2 and 3 of the drawings. The post at its free end carries an electric light fixture 20, preferably of the type capable of dimming the electric lamp or lamps carried by the fixture. Arms 21 for effecting the operation of the dimmer have connected thereto cables 22 which pass over pulleys 23 journaled to the post 13 and also over a pulley 24 and have their ends adjustably connected, as shown at 25, this connection being a slack take-up. The pulley 24 is secured to an operating shaft 26 journaled in the cabinet or other support for the mirror and is provided with a finger piece 27, whereby the rotation of the latter may increase or decrease the brilliancy of the illumination by the operation of the dimmer.

As shown in Figure 2 of the drawings, a single electric lamp is applied to the fixture, while in Figure 7 is suggested the employment of a series of electric lamps. Thus it will be seen that a person positioned in front of the mirror may readily control the brilliancy of the illumination and also may adjust the illuminating means toward or away from the mirror. Carried by the shaft 18, at opposite sides of the nut 17, are adjustable stops 29 which limit the travel of the nut 17 in opposite directions.

The operating shaft 26 is supported in a bracket 30.

An electric plug fixture 31 to which an electrical source may be connected is suitably fitted in the cabinet 1 and is connected by conductors 32 to the electric fixture 20 and interposed in one of the conductors is a control switch 33, this being conveniently located so that the user of the device may turn on or off the electric lamp.

A heat insulating plate or member 34 is secured to the back of the mirror to protect the latter from the heat provided by the illuminating means.

The cabinet 1 has provided in opposite sides thereof suitable ventilating louvers 35 to permit of the escape of heat from within the cabinet.

In Figure 7 of the drawings, the mirror 6 has surrounding it the transparent or semi-transparent area 7 so that light rays may pass therethrough entirely about said mirror. This mirror 6 is suitably hung or made a part of an article of furniture and, in this instance, it is a part of a dressing table 5, although the nature of the piece of furniture is immaterial.

A device constructed in accordance with the foregoing is capable of efficient use by persons who stand or position themselves at different distances with respect to the mirror and also have differences in vision.

It is, of course, understood that the character of lighting means may be varied as it may be a single type unit or a multiple type unit.

It is to be understood that changes, variations and modifications may be made in the device without departing from the spirit of the invention or sacrificing any of its advantages and as fall within the scope of the appended claims.

What is claimed is:

1. A device of the character set forth comprising a support, a reflector carried by said support, a combined lens and mirror mounted to said support in advance of the reflector, a lamp post adjustable to length movably mounted to the support, illuminating means carried by said post and positioned rearwardly of the mirror and lens, and means for adjusting the post towards and from the mirror.

2. A device of the character set forth comprising a support, a reflector carried by said support, a combined lens and mirror mounted to said support in advance of the reflector, a lamp post adjustable to length movably mounted to the support, an electrical light dimmer carried by said post, an electric light carried by the dimmer, means for tilting the post towards and from the mirror, and a control for the dimmer.

3. A device of the character set forth comprising a cabinet, a lens supported by said cabinet, a mirror carried by said lens with the latter extending about said mirror, a reflector carried by said cabinet and engageable with the lens, a telescopic lamp post arranged in the cabinet rearwardly of the mirror, means for hinging the lamp post to the cabinet, an electric lamp dimmer carried by the post, an electric illuminating means carried by the dimmer, means for controlling the dimmer, and means for swinging the lamp post towards and from the mirror.

4. A device of the character set forth comprising a cabinet, a lens supported by said cabinet, a mirror carried by said lens with the latter extending about said mirror, a reflector carried by said cabinet and engageable with the lens, a telescopic lamp post arranged in the cabinet rearwardly of the mirror, means for hinging the lamp post to the cabinet, an electric lamp dimmer carried by the post, an electric illuminating means carried by the dimmer, means for controlling the dimmer, a crank shaft journaled to the cabinet and having one end connected to the post, a feed nut pivoted to the other end of the crank shaft, a threaded rod journaled to the cabinet and threaded to the feed nut for swinging the post towards and from the mirror.

5. A device of the character set forth comprising a cabinet, a lens carried by said cabinet, a mirror supported by said lens, a telescopic lamp post arranged in the cabinet, a reflector arranged between the lens and the post and adjustably supported by the cabinet, an electric lamp dimmer supported by said post, an electric lamp carried by the dimmer, means for hinging the post to the cabinet to permit the latter to be tilted towards and from the mirror, an adjustable means for limiting the tilting of the post towards the mirror, an operating means for tilting the post, and an operating means carried by the cabinet and connected to the dimmer.

6. A device of the character set forth comprising a cabinet, a lens carried by said cabinet, a mirror supported by said lens, a telescopic lamp post arranged in the cabinet, a reflector arranged between the lens and the post and adjustably supported by the cabinet, an electric lamp dimmer supported by said post, an electric lamp carried by the dimmer, means for hinging the post to the cabinet to permit the latter to be tilted towards and from the mirror, an adjustable means for limiting the tilting of the post towards the mirror, an operating means for tilting the post, an operating means carried by the cabinet and connected to the dimmer, and a heat insulated element arranged between the mirror and the electric lamp.

7. A device of the character set forth comprising a cabinet, a lens carried by said cabinet, a mirror supported by said lens, a telescopic lamp post arranged in the cabinet, a reflector arranged between the lens and the post and adjustably supported by the cabinet, an electric lamp dimmer supported by said post, an electric lamp carried by the dimmer, means for hinging the post to the cabinet to permit the latter to be tilted towards and from the mirror, an adjustable means for limiting the tilting of the post towards the mirror, an operating means for tilting the post, an operating means carried by the cabinet and connected to the dimmer, and ventilating means for said cabinet.

DE WITT WARNER.